US010764744B2

(12) United States Patent
Hua et al.

(10) Patent No.: US 10,764,744 B2
(45) Date of Patent: Sep. 1, 2020

(54) SYSTEM AND METHOD FOR SUPPORTING SHARED SERVICE PROFILES BETWEEN NETWORK DEVICES OF CORE NETWORK

(71) Applicant: Verizon Patent and Licensing Inc., Arlington, VA (US)

(72) Inventors: Suzann Hua, Walnut Creek, CA (US); Priscilla Lau, Concord, CA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 81 days.

(21) Appl. No.: 16/023,208

(22) Filed: Jun. 29, 2018

(65) Prior Publication Data

US 2020/0008046 A1   Jan. 2, 2020

(51) Int. Cl.
*H04L 12/26* (2006.01)
*H04W 8/18* (2009.01)
*H04W 68/02* (2009.01)
*H04W 48/14* (2009.01)
*H04W 8/12* (2009.01)
*H04W 4/08* (2009.01)
*H04L 29/08* (2006.01)

(52) U.S. Cl.
CPC ............ *H04W 8/186* (2013.01); *H04W 4/08* (2013.01); *H04W 8/12* (2013.01); *H04W 48/14* (2013.01); *H04W 68/02* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 2010/0323700 | A1* | 12/2010 | Bachmann | H04W 36/0066 455/436 |
| 2011/0228707 | A1* | 9/2011 | Multikainen | H04W 8/04 370/259 |
| 2015/0382241 | A1* | 12/2015 | Ophir | H04W 24/08 370/328 |
| 2018/0098216 | A1* | 4/2018 | Vincent | H04W 8/20 |
| 2018/0183938 | A1* | 6/2018 | Cai | H04M 15/61 |
| 2018/0279214 | A1* | 9/2018 | Chandramouli | H04W 60/00 |

* cited by examiner

*Primary Examiner* — Zewdu A Beyen

(57) ABSTRACT

Systems and method are provided to reduce redundant data transfers for service profiles within a wireless core network. A network device in the core network receives, from a mobility management entity (MME), a user profile request. The user profile request includes a user identifier for an end device. The network device determines that a user profile corresponding to the user identifier includes a shared service profile and determines, when the user profile includes a shared service profile, whether the MME has stored the shared service profile. When the MME has not stored the shared service profile, the network device sends, to the MME, the shared service profile and a shared profile identifier for the shared service profile. The network device sends, to the MME, a response to the user profile request, the response including the user identifier and the shared profile identifier for the shared service profile.

20 Claims, 10 Drawing Sheets

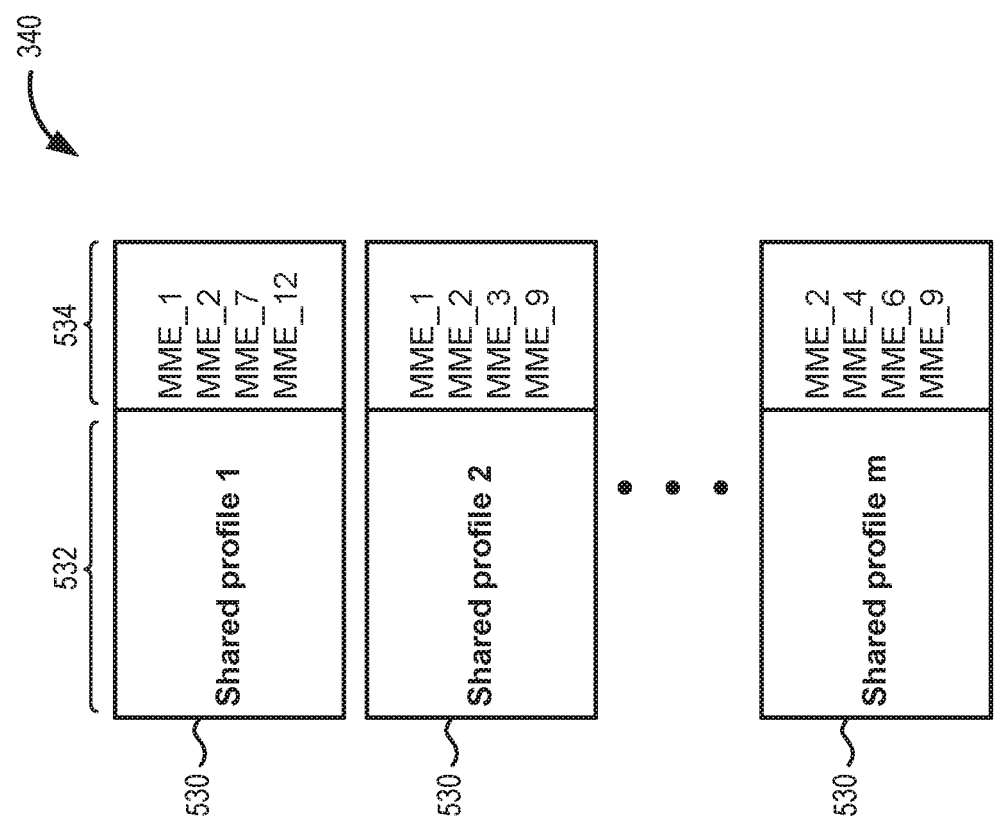

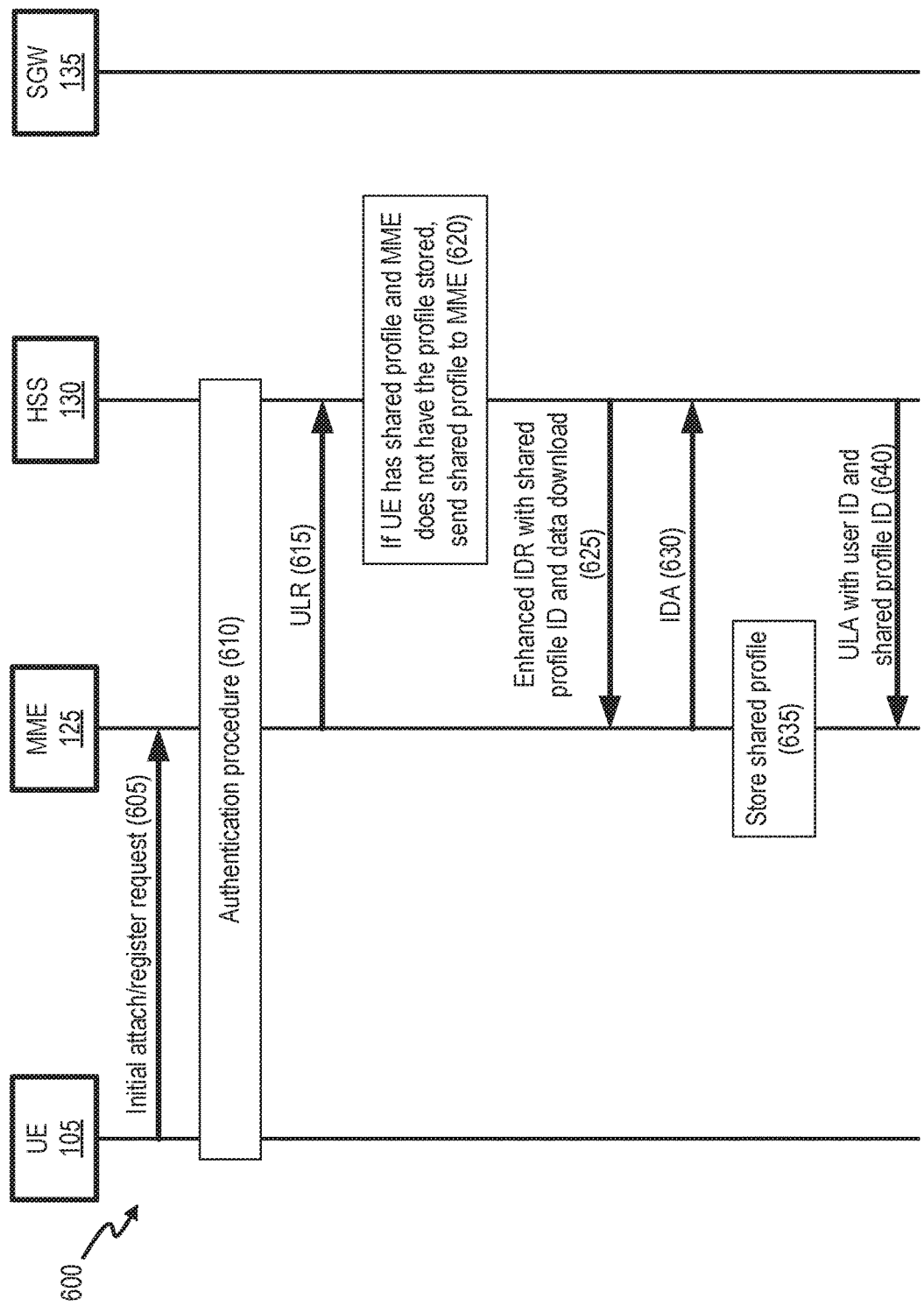

SYSTEM AND METHOD FOR SUPPORTING SHARED SERVICE PROFILES BETWEEN NETWORK DEVICES OF CORE NETWORK

BACKGROUND

The Internet of Things (IOT) may be described as a network of physical objects or "things" embedded with various types of electronics, software, sensors, logic, circuitry, etc., that can collect and exchange data. A "thing" (also referred to as an "IOT device" or a "machine-type communication (MTC) device") may connect to a service hosted on the Internet indirectly (e.g., via another network device, such as a coordinator, a gateway, etc.) or directly. For network service providers, their networks must provide services to large number of similar IOT or non-IOT devices while balancing resources for other uses, and devices.

BRIEF DESCRIPTION OF THE DRAWINGS

FIG. 5B is a diagram illustrating an exemplary data structure used by the HSS in FIG. 3;

FIGS. 6A and 6B are diagrams showing exemplary communications for individual user profile downloading in a portion of the network environment of FIG. 1;

DETAILED DESCRIPTION OF THE PREFERRED EMBODIMENTS

Figure 1:
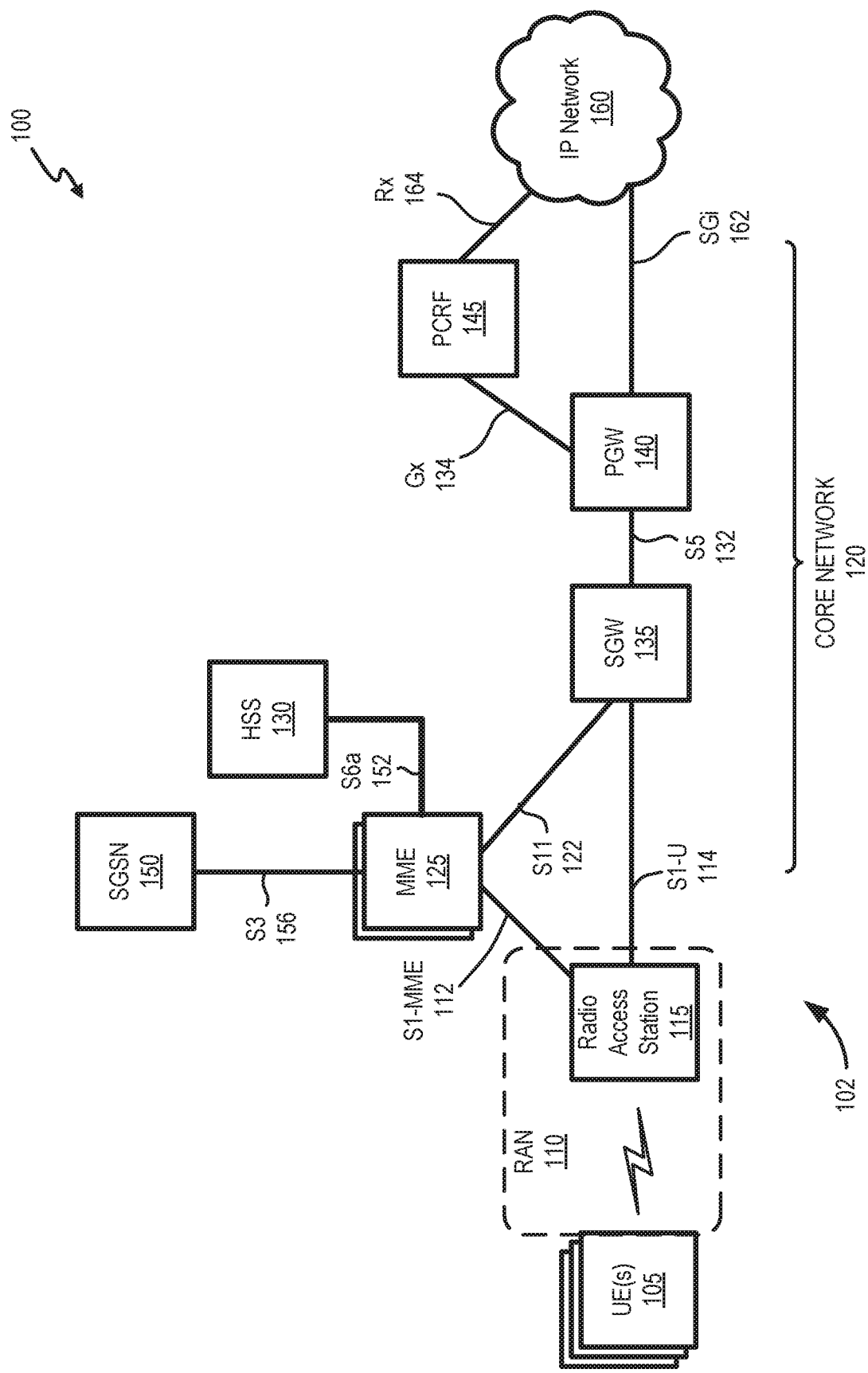
FIG. 1 is a diagram that depicts an exemplary network environment in which systems and methods described herein may be implemented.

The following detailed description refers to the accompanying drawings. The same reference numbers in different drawings may identify the same or similar elements.

Systems and methods described herein support shared service profiles at the interface between a serving mobility management entity (MME) and a home subscriber server (HSS). The shared service profiles reduce redundant service profile data downloading and service profile storage by the MME. One of the characteristics of machine-type communications (MTC) is that a large quantity of MTC devices are of the same type and can have the same basic service profiles with only different identities. Even for regular consumer wireless users (e.g., using non-MTC devices), many users have the same service subscriptions and, therefore, the same service profiles.

For a Long-Term Evolution (LTE) core network, a wireless subscriber's service profile is stored in an HSS, and passed to a serving MME when the user is registered to the MME. Currently to save storage space and simplify service profile provisioning and updates, some forms of a shared service profile can be used at the HSS. However, shared service profiles are not currently supported by the serving MMEs or in the interface between the serving MME and the HSS. When the HSS sends a user service profile to the MME, regardless how many users have same service profile (which could be thousands of users), the HSS will send a complete service profile to the MME for each individual user. Furthermore, the MME will store the complete service profile for each of the users.

Particularly, the absence of shared a service profile in the DIAMETER S6a interface between the serving MME and the HSS creates unnecessary per-subscriber profile downloading traffic for both initial registrations and later subscriber profile updates. Furthermore, such redundant per-subscriber service profile downloading also results in unnecessary service profile storage at the MME.

Systems and method are described herein to reduce redundant data transfers and storage for service profiles within a wireless core network. A network device (e.g., an HSS) in the core network may receive, from an MME, a user profile request. The user profile request includes a user identifier for an end device. The network device may determine that a user profile corresponding to the user identifier includes a shared service profile and may determine, when the user profile includes a shared service profile, whether the MME has previously stored the shared service profile. When the MME has not previously stored the shared service profile, the network device may send, to the MME, the shared service profile and a shared profile identifier for the shared service profile. When the MME has previously stored the shared service profile and the shared profile identifier, the network device sends, to the MME, a response to the user profile request, the response including a user profile with the user identifier and the shared profile identifier. The MME may use the shared profile identifier to retrieve the previously stored shared service profile from local storage and apply the user profile for the end device. Subsequent user profiles that use the same shared service profile can be provided to the MME by simply sending the shared profile identifier associated with an applicable user identifier.

FIG. 1 is a diagram that depicts an exemplary network environment 100 in which systems and methods described herein may be implemented. As shown in FIG. 1, network environment 100 may include groups of user equipment (UE) 105 (referred to individually and generically as UE 105); a wireless network 102 including a radio access network (RAN) 110 and a core network 120; and an Internet Protocol (IP) network 160.

In one implementation, wireless network 102 may be an LTE 4G wireless network, but could be any advanced wireless network, such as a 5G network, and may include one or more devices that are physical and/or logical entities interconnected via standardized interfaces. Wireless network 102 provides wireless packet-switched services and wireless IP connectivity to user devices (such as UEs 105) to provide, for example, data, voice, and/or multimedia services. RAN 110 may include one or more radio access stations 115 (e.g., an enhanced NodeB, a 5G gNodeB, etc.). Radio access stations 115 may be connected to devices in core network 120.

Core network 120 (also referred to herein as a "wireless core network") may include one or multiple networks of one or multiple types. According to an exemplary implementation, core network 120 may include a complementary network pertaining to RAN 110, such as an evolved packet core (EPC) for an LTE network or a New Radio core for a 5G network. Core network 120 may include one or more MME devices 125, an HSS device 130, a serving gateway (SGW) device 135, a packet data network gateway (PGW) device 140, and a policy charging rules function (PCRF) device 145. FIG. 1 depicts a representative network environment 100 with exemplary components and configuration shown for purposes of explanation. While specific components of core network 120 described herein may use terminology for LTE networks, 5G network components may also be used in other embodiments. For example, core network 120 may include a next generation core (NGC) network with an Access and Mobility Management function (AMF), a Session Management function (SMF), an Authentication Server Function (AUSF), a User Plane Function (UPF) and/or a Unified Data Management (UDM) function that may perform features described herein. Other embodiments may include additional or different network entities in alternative configurations than which are exemplified in FIG. 1.

UE 105 (also referred to herein as an "end device") includes a device that has computational and wireless communication capabilities. UE 105 may be implemented as a mobile device, a portable device, or a stationary device. UE 105 may be implemented as a Machine Type Communication (MTC) device, an Internet of Things (IoT) device, an enhanced MTC device (eMTC) (also known as Cat-M1), a NB-IoT device, a machine-to-machine (M2M) device, a user device, or some other type of wireless end node. By way of further example, UE 105 may be implemented as a smartphone, a personal digital assistant, a tablet, a wearable device, a set top box, an infotainment system in a vehicle, a smart television, a game system, a music playing system, or some other type of wireless user device. According to various exemplary embodiments, UE 105 may be configured to execute various types of software (e.g., applications, programs, etc.). The number and the types of software may vary from one UE 105 to another UE 105.

Radio access station 115 may include one or more devices and other components having functionality that allow UE 105 to wirelessly connect to RAN 110. Radio access station 115 may interface with core network 120 via an S1 interface, which may be split into a control plane S1-MME interface 112 and a user (or data) plane S1-U interface 114. S1-MME interface 112 may provide an interface between radio access station 115 and MME device 125. S1-U interface 114 may provide an interface between radio access station 115 and SGW 135.

MME device 125 (also simply referred to as MME 125) may include a network device that implements control plane processing for core network 120. For example, MME 125 may implement tracking and paging procedures for UE 105, may activate and deactivate bearers for UE 105, may authenticate a user of UE 105, and may interface to non-LTE radio access networks (e.g., via a serving general packet radio service (GPRS) support node (SGSN) 150). MME 125 may also select a particular SGW 135 for a particular UE 105. MME 125 may communicate with SGW 135 through an S11 interface 122 to create and manage a new session for a particular UE 105. An MME 125 serving a particular UE 105 (also referred to as a serving MME) may interface with other MME devices (not shown) in core network 120 and may send and receive information associated with UEs 105, which may allow one MME device 125 to take over control plane processing of UEs 105 serviced by another MME device 125, if the other MME device 125 becomes unavailable. According to implementations described herein, MME 125 may obtain subscriber profiles (also referred to herein as user profiles) from HSS 130 when one of UEs 105 connects to core network 120. The subscriber profiles may include shared service profiles, as described further below. MME 125 may communicate with HSS 130 through an enhanced/modified (i.e., over the prior/existing standard S6a interface) S6a interface 152 that supports use of shared service profiles.

HSS device 130 (also simply referred to as HSS 130) may include a network device that stores information associated with UEs 105 and/or information associated with users/owners of UE 105. For example, HSS 130 may store subscriber profiles, such as a Subscriber Profile Repository (SPR), that includes authentication and access authorization information. As described further herein, HSS may store the subscriber profiles using shared service profiles that are used for multiple UEs 105. Shared service profiles may include, for example, particular services, bandwidth limits, QoS settings, classes of service, etc., that may apply to multiple subscribers. As described further herein, HSS 130 may use enhanced S6a interface 152 to provide to MME 125 subscriber profiles that include pointers to separate shared service profiles.

SGW device 135 (also simply referred to as SGW 135) may include a network or computational device that provides an access point to and from UE 105, may handle forwarding of data packets for UE 105, and may act as a local anchor point during handover procedures between eNBs 115. SGW 135 may interface with PGW 140 through an S5 interface 132.

PGW device 140 (also simply referred to as PGW 140) includes a network or computational device that functions as a gateway to IP network 160 through an SGi interface 162. In one exemplary implementation, PGW 140 may be a traffic exit/entry point for core network 120. PGW 140 may perform policy enforcement, packet filtering for each user, charging support, lawful intercept, and packet screening.

PCRF device 145 (also simply referred to as PCRF 145) may include a network or computational device that provides policy control decision and flow based charging control functionalities. PCRF 145 may provide network control regarding service data flow detection, gating, QoS and flow based charging, etc. PCRF 145 may determine how a data stream is treated once mapped to a bearer, and may ensure that the user plane traffic mapping and treatment is in accordance with a user's subscriber profile. PCRF 145 may communicate with PGW 140 using a Gx interface 134.

SGSN 150 may include a network device that interfaces with MME 125 to provide control plane functions for mobility between RAN 110 and third generation mobile telecommunications (3G) 3GPP access networks. SGSN 150 may communicate with MME 125 using an S3 interface 156.

IP network 160 may include one or multiple networks of one or multiple types. For example, IP network 160 may include the Internet, the World Wide Web, an IP Multimedia Subsystem (IMS) network, a cloud network, a private IP network, some other type of backend network, and so forth.

Devices and networks of environment 100 may be interconnected via wired and/or wireless connections. While FIG. 1 shows exemplary components of network environment 100, in other implementations, network environment 100 may include fewer components, different components, differently-arranged components, or additional components than depicted in FIG. 1. Additionally or alternatively, one or more components of network environment 100 may perform functions described as being performed by one or more other components of network environment 100.

Figure 2:
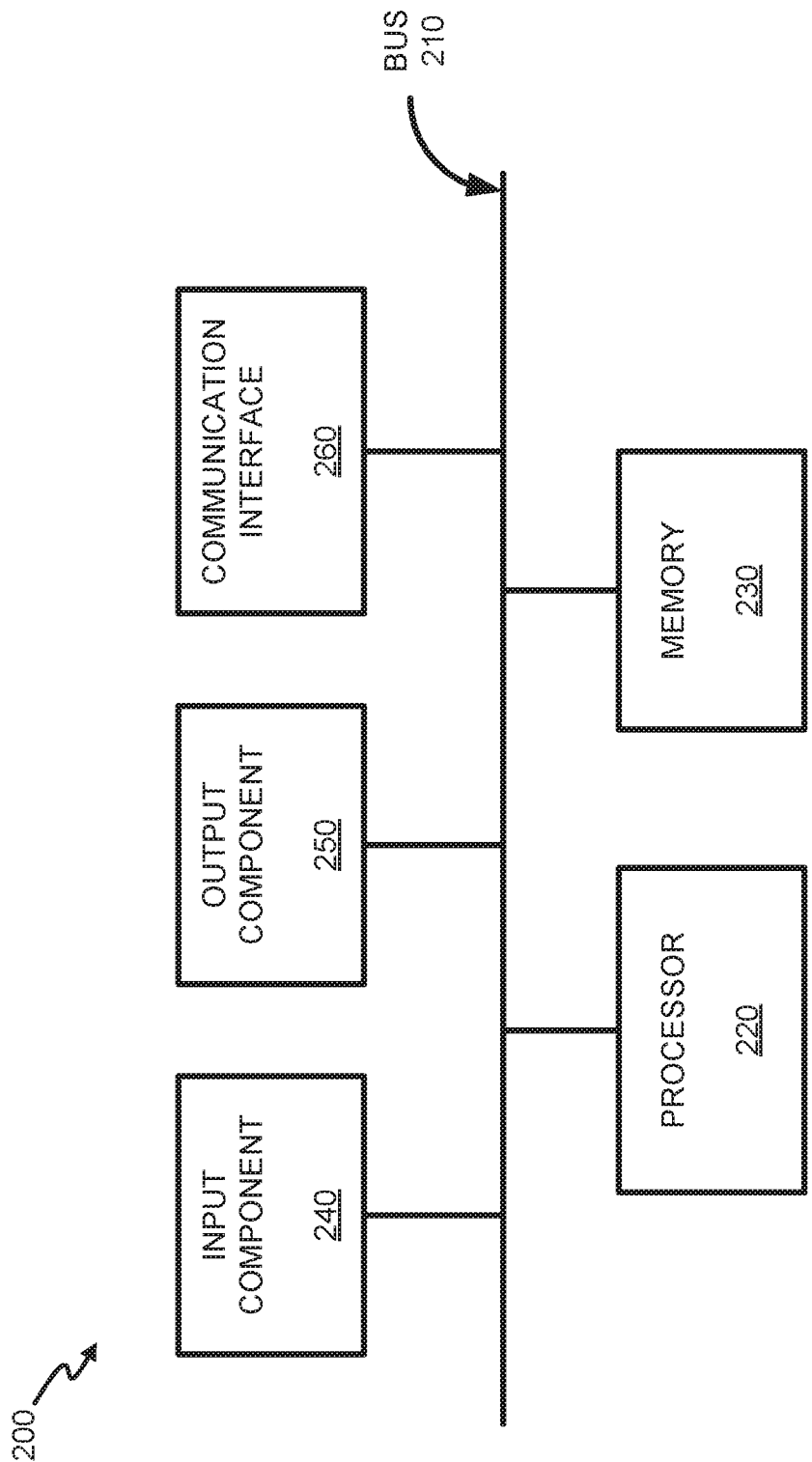
FIG. 2 shows a diagram of exemplary components that may be included in a computing device included in the network environment shown in FIG. 1.

FIG. 2 is a diagram illustrating exemplary components of a device 200. Device 200 may correspond, for example, to a component of UE 105, radio access station 115, MME 125, HSS 130, SGW 135, PGW 140, PCRF 145, SGSN 150, or another component of wireless network 102. Alternatively or additionally, UE 105, radio access station 115, MME 125, HSS 130, SGW 135, PGW 140, PCRF 145, and SGSN 150 may include one or more devices 200 and/or one or more components of device 200.

Device 200 may include a bus 210, a processor 220, a memory 230, an input component 240, an output component 250, and a communication interface 260. Although FIG. 2 shows exemplary components of device 200, in other implementations, device 200 may contain fewer components, additional components, different components, or differently arranged components than those depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220. Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, communication interface 260 may include one or more antennas to transmit and/or receive RF signals over the air. Communication interface 260 may, for example, receive RF signals and transmit them over the air to UE 105/radio access station 115, and receive RF signals over the air from radio access station 115/UE 105. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hard-wired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. Additionally, or alternatively, one or more operations described as being performed by a particular component of device 200 may be performed by one or more other components, in addition to or instead of the particular component of device 200.

Figure 3:
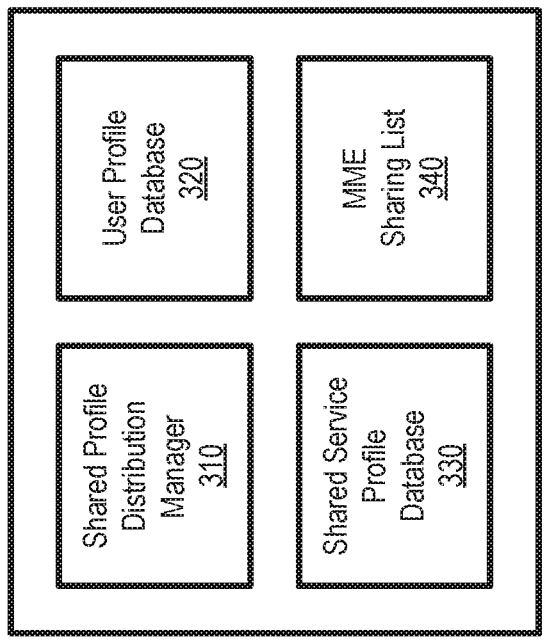
FIG. 3 is a block diagram showing exemplary logical components of the home subscriber server (HSS) device of FIG. 1.

FIG. 3 is a block diagram illustrating exemplary components of HSS 130. As shown in FIG. 3, HSS 130 may include a shared profile distribution manager 310, a user profile database 320, a shared service profile database 330, and an MME sharing list 340. The components of FIG. 3 may be implemented, for example, by processor 220 in conjunction with memory 230.

Shared profile distribution manager 310 may coordinate sending user profiles, shared service profiles, and/or shared service profile updates to MME 125, where multiple user profiles can reference the same shared service profile. According to one implementation, shared profile distribution manager 310 may send a DIAMETER Insert-Subscriber-Data-Request (IDR) to a serving MME 125 via S6a interface 152. The IDR may include additional information elements, or may use existing information elements that carry specific attribute value pairs (AVPs), that would otherwise not exist in a standard IDR. Thus, the IDR may be referred to as an "enhanced IDR," while the S6a interface for the IDR may be referred to as an "enhance S6a interface." According to implementations described herein, a User-Name AVP of the IDR may be used to indicate a shared profile identifier (ID) value (e.g., an integer value or string). Also, an IDR-Flag's AVP may be enhanced to indicate "Shared Profile Download" or "Shared Profile Update" (in addition to existing standard IDR flags). If the IDR-Flag's AVP indicates Shared Profile Download, the full corresponding shared profile may be included with the IDR. If the IDR-Flags AVP indicates Shared Profile Update, then only the updated part of shared profile may be included with the IDR. Furthermore, in one implementation, shared profile distribution manager 310 may provide a Subscription-Data AVP populated with shared service profile contents with multiple AVPs.

User profile database 320 may include a database or another type of formatted storage with subscriber profiles available to HSS 130. User profile database 320 may correspond to a Subscriber Profile Repository (SPR), for example. In one implementation, user profile database 320 may include user profiles that point to a particular shared service profile in shared service profile database 330. In another implementation, user profile database 320 may include both user profiles with a shared service profile and other user profiles without a shared service profile.

Shared service profile database 330 may include a database or another type of formatted storage with service profiles that may be use by one or more user profiles. Each shared service profile in shared service profile database 330 may include a unique identifier (e.g., a shared profile ID) that may be referenced in a user profile.

MME sharing list 340 may include a database or another type of formatted storage that tracks which MMEs 125 have received/stored which shared service profile. For example, MME sharing list 340 may associate a shared profile ID with a listing of one or more MME identifiers to indicate which MMEs 125 have already stored that shared service profile.

Still referring to FIG. 3, assuming a user profile includes a shared service profile, whenever HSS 130 receives a DIAMETER Update-Location-Request (ULR) and is required to download a user's profile data to MME 125, shared profile distribution manager 310 may check whether the requesting MME 125 is already in the MME sharing list 340 associated with the necessary shared service profile. If the MME 125 is not associated with the shared service profile in MME sharing list 340, shared profile distribution manager 310 may send a DIAMETER S6a IDR to download the shared service profile to MME 125. In this case, the IDR Flag's AVP would indicate Shared Profile Download. Also, shared profile distribution manager 310 may add the MME ID to MME sharing list 340 for the particular shared profile ID.

Figure 4:
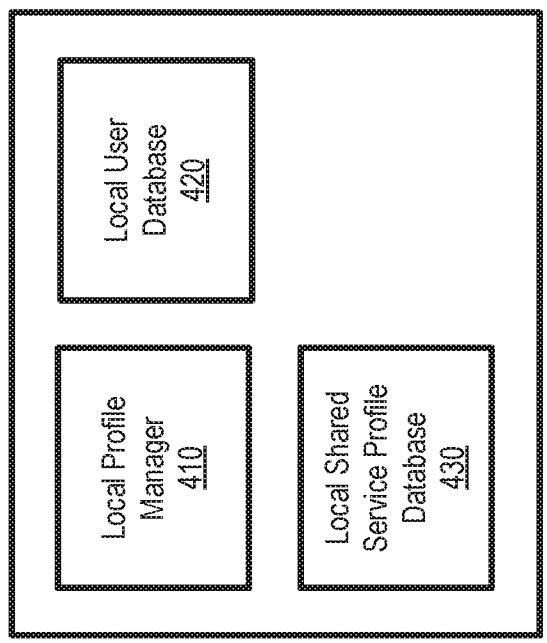
FIG. 4 is a block diagram showing exemplary logical components of the mobility management entity (MME) device of FIG. 1.

FIG. 4 is a block diagram illustrating exemplary components of MME 125. As shown in FIG. 4, MME 125 may include a local profile manager 410, a local user database 420, and a local shared service profile database 430. The components of FIG. 4 may be implemented, for example, by processor 220 in conjunction with memory 230.

Local profile manager 410 may support receiving "Shared Profile Download" or "Shared Profile Update" AVPs in IDRs from HSS 130. If the IDR-Flag indicates Shared Profile Downloading or Shared Profile Update, then the User-Name will contain a shared profile ID instead an individual user's ID. If the IDR-Flag indicates Shared Profile Download, local profile manager 410 may store the received complete profile data as a new/initial shared profile in a shared data space (e.g., local shared service profile database 430). If the IDR-Flag indicates Shared Profile Update, local profile manager 410 may update the already stored shared profile data according to the data in the received IDR.

Local user database 420 may store user profiles for UEs 105 associated with MME 125. Thus, in one implementation, local user database 420 may include a subset of user profiles from user profile database 320. Local user database 420 may be implemented as a database, flat file, or another data structure.

Local shared service profile database 430 may store one or more shared service profiles received from HSS 130 to use with locally-stored user profiles (e.g., in local user database 420). Thus, in one implementation, local shared service profile database 430 may include a subset of user profiles from shared service profile database 330. Shared service profile database 330 may be implemented as a database, flat file, or another data structure.

Figure 5A:
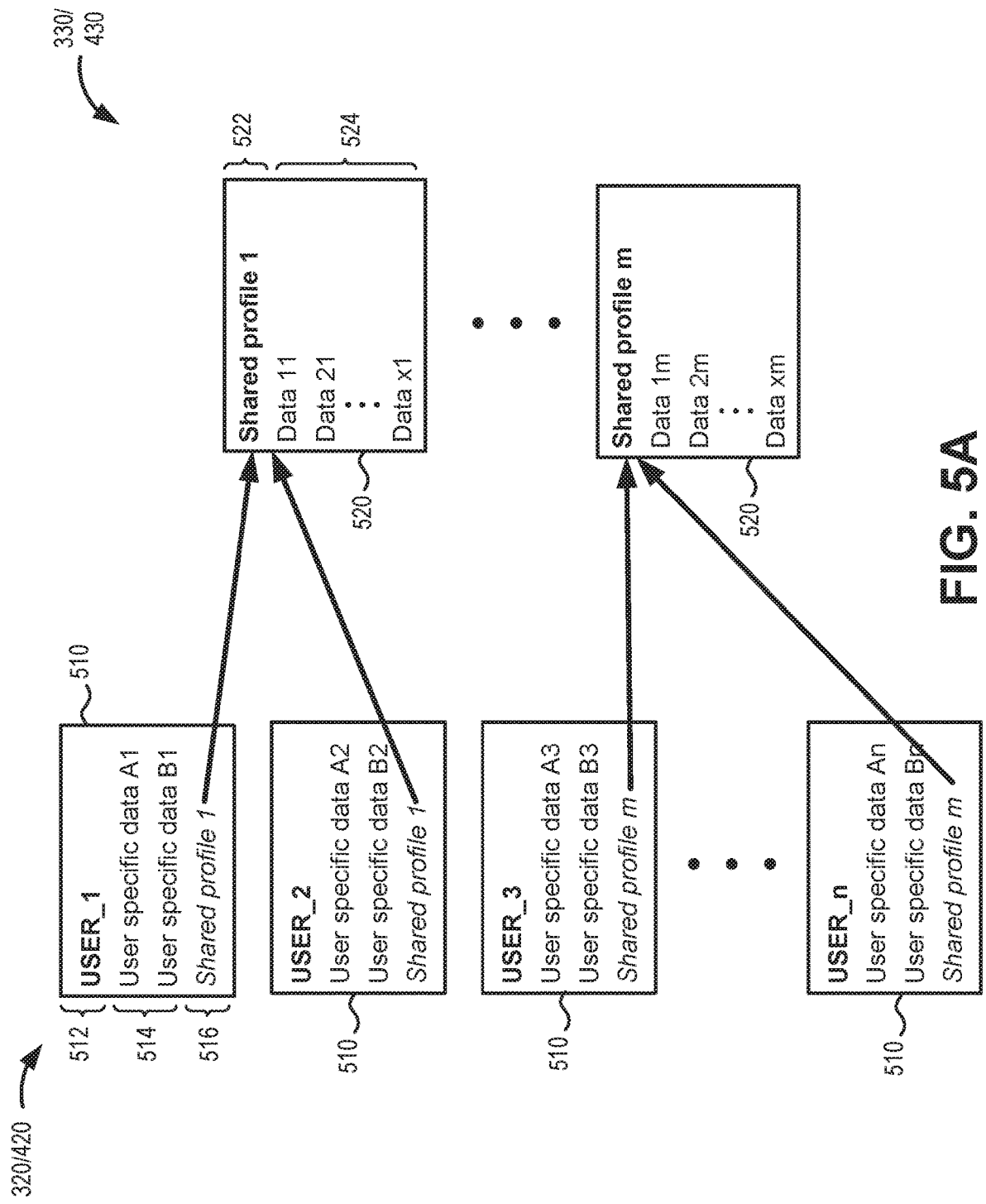
FIG. 5A is a diagram illustrating exemplary data structures used by the HSS and the MME in FIGS. 3 and 4.

FIG. 5A is a diagram illustrating exemplary data structures used by HSS 130 and MME 125. Particularly, user profile database 320 and local user database 420 may include multiple subscriber entries 510, while shared service profile database 330 or local shared service profile database 430 may include multiple shared profile entries 520. Each of entries 510 may include a user ID 512, user-specific data 514, and a reference 516 to a specific shared profile ID. User ID 512 may provide a unique ID for a particular user/subscriber. User-specific data 514 may include user specific data (if any), such as additional identification information for UE 105. Reference 516 may include a specific shared profile ID corresponding to one of the shared profiles in shared service profile database 330 or local shared service profile database 430.

Each of shared profile entries 520 may include a shared profile ID 522 and profile data 524. Shared profile ID 522 may provide a unique ID (e.g., an alphanumeric string) for a particular shared service profile. As shown in FIG. 5A, one of shared profile IDs 522 may be referenced within one or more of subscriber entries 510. Profile data 524 may include a combination of profile setting (e.g., policies) that may be applied to one or more UEs 105. According to an implementation, each shared profile ID 522 may be associated with a unique combination of data in profile data 534.

Although FIG. 5A shows exemplary data structures for user profile database 320, local user database 420, shared service profile database 330, and local shared service profile database 430, in other implementations, databases 320, 330, 420, and 430 may include different fields, fewer fields, or additional fields than depicted in FIG. 5A. For example, in another implementation, one of user profile database 320 and local user database 420 may include additional fields than the other of user profile database 320 and local user database 420.

FIG. 5B is a diagram illustrating an exemplary structure for MME sharing list 340 used by HSS 130. Particularly, MME sharing list 340 may include multiple shared profile entries 530. Each of shared profile entries 530 may include a shared profile ID 532 and a list of MME identifiers 534. Each of shared profile ID 532 may match one of shared profile IDs 522 from shared service profile database 330. The list of MME identifiers 534 may include an MME identifier for each of MMEs 125 to which HSS 130 has sent a shared service profile corresponding to the shared profile ID 532.

Although FIG. 5B shows an exemplary data structure for MME sharing list 340, in other implementations, MME sharing list 340 may include different fields, fewer fields, or additional fields than depicted in FIG. 5B. For example, in another implementation, MME sharing list 340 may include additional fields to monitor distribution of shared profile updates.

Figure 6B:
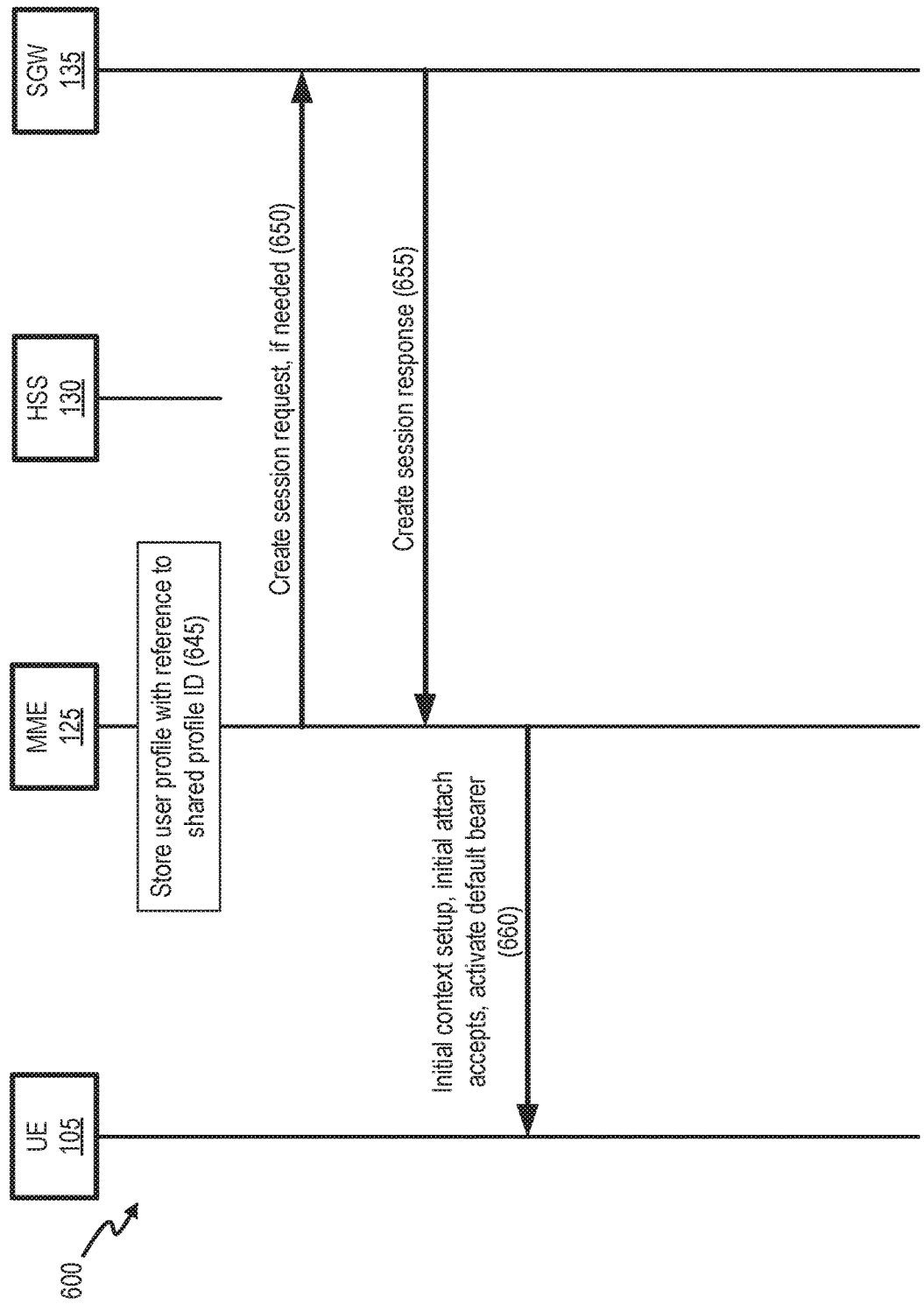

FIGS. 6A and 6B are diagrams showing exemplary communications for individual user profile downloading in a portion 600 of network environment 100. As shown in FIGS. 6A and 6B, network portion 600 may include UE 105, MME 125, HSS 130, and SGW 135.

Referring to FIG. 6A, UE 105 may provide an initial attachment request 605 to MME 125. Initial attachment request 605 may be provided, for example, via radio access station 115 (not shown). The attach request may include a unique identifier associated with UE 105. In response to initial attachment request 605, MME 125 may perform an authentication procedure 610 in which MME 125 may retrieve UE profile data from HSS 130. The UE profile data may identify UE information and subscription information for UE 105.

MME 125 may also send an update location request (ULR) message 615 to HSS 130 to update/confirm the location of UE 105. Update location request 615 may be sent via S6a interface 152. In response at reference 620, HSS 130 may access user profile database 320 to determine if UE 105 has a shared profile (e.g., as indicated in Reference 516 of the corresponding subscriber entry 510 for UE 105). Assuming UE 105 has a shared profile, HSS 130 may refer to MME sharing list 340 to determine whether MME 125 (e.g., the serving MME) already has stored the necessary shared profile, as further indicated at reference 620.

In the example of FIG. 6A, assume that UE 105 uses a shared service profile and that MME 125 has not previously stored the necessary shared profile for UE 105. Thus, HSS 130 will first send the shared profile to MME 125. According to implementations described herein, HSS 130 may send an enhanced Insert-Subscriber-Data-Request (IDR) 625 that includes a shared profile ID, a Shared Profile Download flag, and corresponding shared profile data. In one implementation, enhanced IDR 625 may be provided via S6a interface 152. In response to enhanced IDR 625, MME 125 may provide an Insert-Subscriber-Data-Answer (IDA) 630 that confirms successful receipt of the shared service profile. As shown in reference 635, MME 125 can store the shared profile, as appropriate.

After receiving IDA 630, HSS 130 may assemble and send an update-location-answer (ULA) message 640 to MME 125. Update-location-answer 640 may include, among other information, the user ID for UE 105 and the corresponding shared profile ID (e.g., user ID 512 and reference 516 from one of subscriber entries 510). HSS 150 may use S6a interface 152 to provide update-location-answer 640 to MME 125.

Referring to FIG. 6B, MME 125 may receive update-location-answer 640 and store 645 the user profile with the reference to the shared service profile. MME 125 may then follow existing wireless systems procedures, such as 3GPP procedures, to establish a default bearer path between UE 105 and SGW 135 (and between SGW 135 and PGW 140, not shown). Thus, MME 125 may provide a create session request 650 to SGW 135. SGW 135 may communicate with PGW 140 to establish a bearer, and SGW 135 may then respond to MME 125 with create session response 655. After receiving create session response 655, MME 125 communicate with radio access station 115 (not shown) and UE 105 to provide an attach accept message, perform initial context setup, and activate the default bearer according to existing wireless systems procedures.

Figure 7:
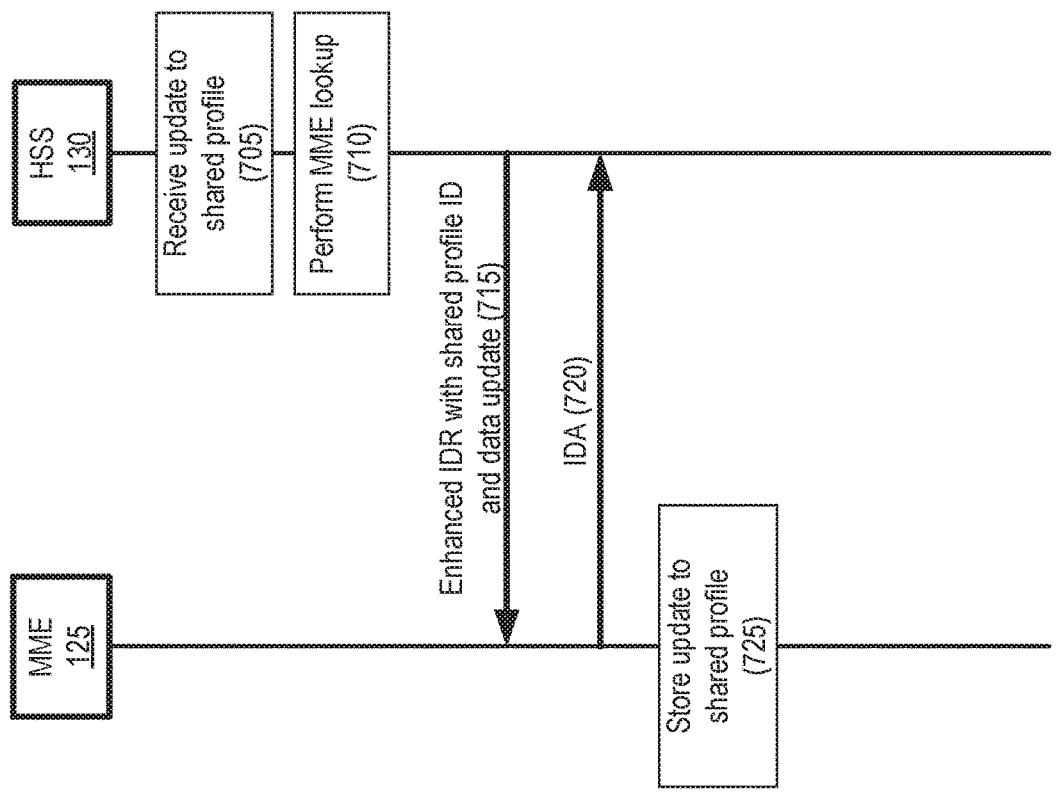
FIG. 7 is a diagram showing exemplary communications for performing a shared profile update in another portion of the network environment of FIG. 1.

FIG. 7 is a diagram showing exemplary communications for performing a shared profile update in a portion 700 of network environment 100. As shown in FIG. 7, network portion 700 may include MME 125 and HSS 130.

As shown in FIG. 7, HHS 130 may receive an update 705 to a shared service profile. The update may be provided, for example, for an enterprise customer with multiple similar UEs 105. Referencing MME sharing list 340, HSS 130 may perform an MME lookup 710 to determine which MMEs 125 already have stored the shared service profile and, therefore, need to receive the update.

In the example of FIG. 7, assume that MME 125 has previously stored the shared service profile that has yet to be updated. Thus, HSS 130 will send the updates for the shared profile to MME 125. According to implementations described herein, HSS 130 may send an enhanced Insert-Subscriber-Data-Request (IDR) 715 that includes a shared profile ID, a Shared Profile Update flag, and corresponding update data. In one implementation, enhanced IDR 715 may be provided via S6a interface 152. In response to enhanced IDR 715, MME 125 may provide an Insert-Subscriber-Data-Answer (IDA) 720 that confirms successful receipt of the shared profile update. As shown in reference 725, MME 125 may store the shared profile update. Thus, when MME 125 receives subsequent ULAs that reference the shared service profile, the MME 125 will retrieve the updated version.

Figure 8:
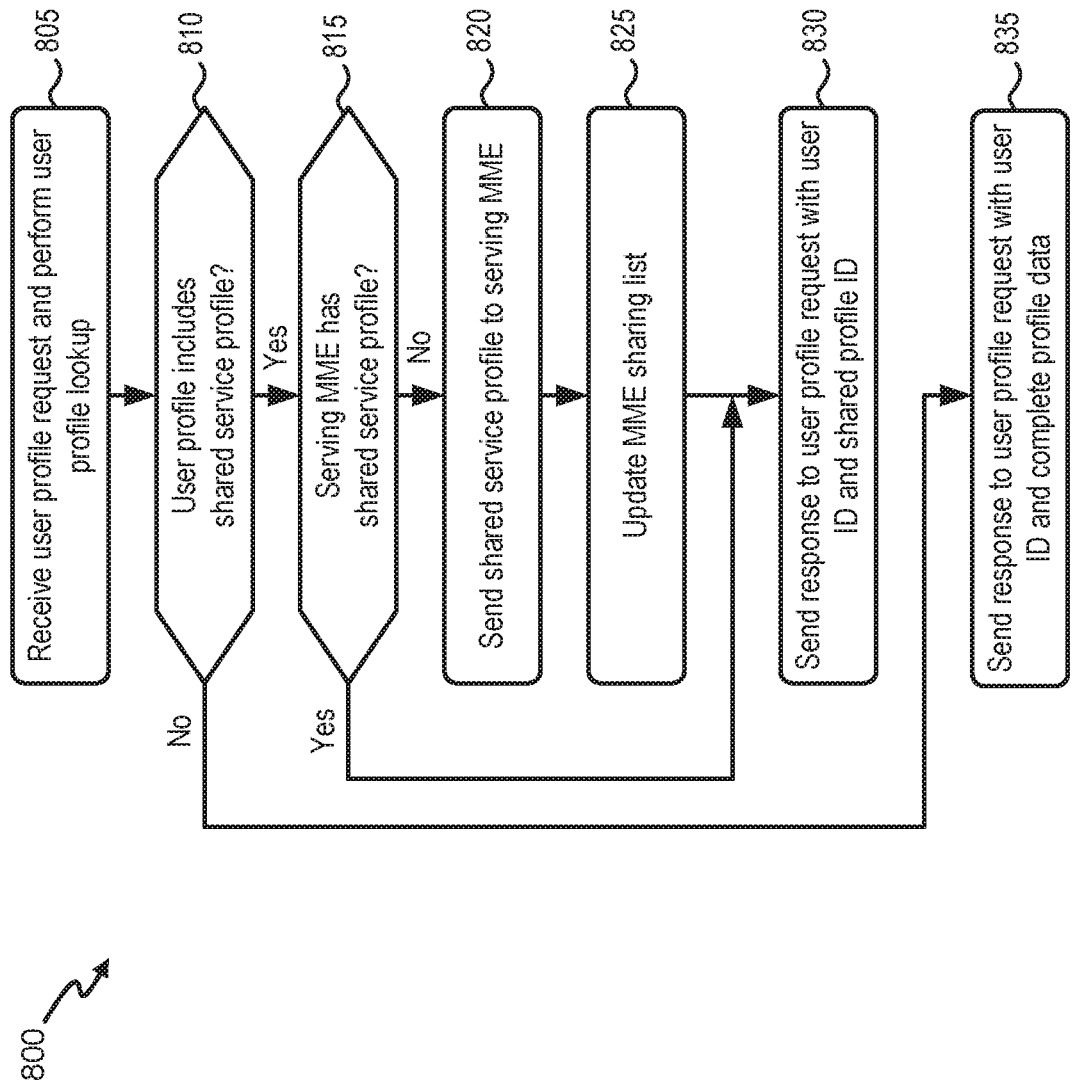
FIG. 8 is a flow diagram that illustrates an exemplary process for providing a user profile with shared service profile, according to an implementation described herein.

FIG. 8 is a flow diagram illustrating an exemplary process 800 for providing a user profile with shared service profile. In one implementation, process 800 may be performed by HSS 130. In another implementation, process 800 may be implemented by HSS 130 and one or more other devices in network environment 100, such as MME 125 or another device in core network 120 (e.g., a unified data management (UDM) device of a 5G core).

Referring to FIG. 8, process 800 may include receiving a user profile request and performing a user profile lookup (block 805), and determining if the user profile includes a shared services profile (block 810). For example, HSS 130 may receive a ULR message from MME 125 with a user ID 512. HSS 130 may refer to user profile database 320 to determine if the matching entry 510 with the user profile ID includes a reference 516 to a specific shared profile ID.

If the user profile includes a shared services profile (block 810—Yes), process 800 may include determining if the serving MME has the shared service profile (block 815). For example, HSS 130 may refer to MME sharing list 340 to determine if an MME ID for the serving MME (e.g., the MME 125 that generated the ULR) is listed with the shared profile ID from the user profile.

If the serving MME does not have the shared service profile (block 815—No), process 800 may include sending the shared service profile to the serving MME (block 820), and updating an MME sharing list (block 825). For example, if HSS 130 fails to find an MME ID of MME 125 associated with the requested shared profile ID 522 in MME sharing list 340, HSS may send the corresponding shared service profile to MME 125. For example, as described in connection with FIG. 6A, HSS 130 may send enhanced IDR 625 with the shared profile ID and profile data download. HSS 130 may update MME sharing list 340, adding the MME ID for MME 125 to the corresponding entry 530 with shared profile ID 532.

If the serving MME has the shared service profile (block 815—Yes) or after sending the shared service profile to the serving MME in block 820, process 800 may include sending a response to the user profile request with the user ID and the shared profile ID (block 830). For example, HSS 130 may send a ULA 640 to MME 125. ULA 640 may include the user ID, the shared profile ID, and (optionally) additional user-specific data. MME 125 may use the shared profile ID to retrieve, from local shared service profile database 430, the corresponding shared service profile for UE 105. Once the shared service profile is stored by MME 125, whenever HSS 130 receives another user profile request (e.g., another ULR) from that MME 125 and determines that a responsive user profile has the same shared service profile, HSS 130 may send to MME 125 a response (e.g., another ULA) including a user identifier and the shared profile identifier (i.e., without having to resend the full shared service profile).

If the user profile does not include a shared services profile (block 810—No), process 800 may include sending a response to the user profile request with the user ID and a complete set of profile data (block 835). For example, if there is no shared service profile associated with the user profile for UE 105, HHS 130 may provide a complete profile to MME 125 in accordance with conventional 3GPP standards.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 220, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 220) of a device. A non-transitory storage medium includes one or more of the storage mediums described in relation to memory 230.

To the extent the aforementioned embodiments collect, store or employ personal information provided by individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method, comprising:
   receiving, by a first network device and from a second network device, a user profile request, the user profile request including a user identifier for an end device;
   determining, by the first network device, that a user profile corresponding to the user identifier includes a shared service profile, wherein the shared service profile includes parameters that apply to multiple subscriber profiles;
   determining, by the first network device and based on the determining that the user profile includes a shared service profile, whether the second network device has previously stored the shared service profile,
      wherein determining whether the second network device has previously stored the shared service profile comprises comparing, by the first network device, a mobility management entity (MME) identifier that corresponds to the second network device to the shared profile identifier in a data structure including multiple MME identifiers associated with the shared profile identifier;
   sending, by the first network device and to the second network device, the shared service profile and a shared profile identifier for the shared service profile, when it is determined that the second network device has not previously stored the shared service profile; and
   sending, by the first network device and to the second network device, a response to the user profile request, the response including the user identifier and the shared profile identifier for the shared service profile, wherein the response to the user profile request is sent separately from the shared service profile.

2. The method of claim 1, further comprising:
   associating, by the first network device and after sending the shared service profile, the MME identifier, corresponding to the second network device, with the shared profile identifier in a data structure of multiple MME identifiers and shared profile identifiers.

3. The method of claim 1, wherein the user profile request includes an Update-Location-Request message, and wherein the response to the user profile request includes an Update-Location-Answer message.

4. The method of claim 1, wherein sending the shared service profile and the shared profile identifier further comprises:
sending the shared service profile and the shared profile identifier via a Diameter S6a interface.

5. The method of claim 4, wherein the shared service profile and a shared profile identifier are included within an Insert-Subscriber-Data-Request (IDR).

6. The method of claim 1, further comprising:
receiving, by the first network device, an update to the shared service profile;
identifying, by the first network device, one or more second network devices that have stored the shared service profile prior to the update; and
sending, by the first network device, the update to the one or more second network devices.

7. The method of claim 6, wherein sending the update comprises:
sending the update and the shared profile identifier via an Insert-Subscriber-Data-Request (IDR) over a Diameter S6a interface.

8. The method of claim 7, wherein the IDR includes an attribute value pair (AVP) to differentiate between a full download and the update for the shared service profile.

9. The method of claim 1, further comprising:
receiving, by the first network device and from the second network device, another user profile request, the other user profile request including another user identifier for a different end device;
determining, by the first network device, that another user profile corresponding to the other user identifier includes the shared service profile; and
sending, by the first network device and to the second network device, another response to the user profile request, the other response including the other user identifier and the shared profile identifier for the shared service profile.

10. A system comprising a first network device, the first network device including:
one or more memories to store instructions;
a communication interface configured to connect to one or more devices in a wireless core network; and
one or more processors to execute the instructions to:
receive, from a second network device, a user profile request, the user profile request including a user identifier for an end device,
determine that a user profile corresponding to the user identifier includes a shared service profile, wherein the shared service profile includes parameters that apply to multiple subscriber profiles,
determine, based on the determining that the user profile includes a shared service profile, whether the second network device has previously stored the shared service profile,
wherein determining whether the second network device has previously stored the shared service profile comprises comparing, by the first network device, a mobility management entity (MME) identifier that corresponds to the second network device to the shared profile identifier in a data structure including multiple MME identifiers associated with the shared profile identifier,
send, to the second network device, the shared service profile and a shared profile identifier for the shared service profile, when it is determined that the second network device has not stored the shared service profile, and
send, to the second network device, a response to the user profile request, the response including the user identifier and the shared profile identifier for the shared service profile, wherein the response to the user profile request is sent separately from the shared service profile.

11. The system of claim 10, wherein the first network device is a home subscriber server (HSS) device for a Long Term Evolution network, and wherein the second network device is a MME for the Long Term Evolution network.

12. The system of claim 10, wherein the one or more processors are further to execute the instructions to:
update, after sending the shared service profile, a data record to indicate the second network device received the shared service profile.

13. The system of claim 10, wherein the first network device is a Unified Data Management (UDM) function for a next generation core (NGC) network, and wherein the second network device is a Access and Mobility Management function (AMF) for the NGC network.

14. The system of claim 10, wherein, when sending the shared service profile and the shared profile identifier, the one or more processors are further to execute the instructions to:
send the shared service profile and the shared profile identifier via an Insert-Subscriber-Data-Request (IDR).

15. The system of claim 10, further comprising the second network device, the second network device including a processor configured to:
store the shared service profile and the shared profile identifier in a local memory,
receive the response to the user profile request,
retrieve the shared service profile from the local memory, and
generate a user profile for the end device based on the user identifier and the shared service profile.

16. The system of claim 10, wherein the one or more processors are further to execute the instructions to:
receive an update to the shared service profile,
identify one or more second network devices that have stored the shared service profile prior to the update, and
send the update to the one or more second network devices.

17. The system of claim 10, wherein the one or more processors are further to execute the instructions to:
receive, from the second network device, another user profile request, the other user profile request including another user identifier for a different end device,
determine that another user profile corresponding to the other user identifier includes the shared service profile, and
send, to the second network device, another response to the user profile request, the other response including the other user identifier and the shared profile identifier for the shared service profile.

18. A non-transitory computer-readable medium containing instructions executable by at least one processor, the computer-readable medium comprising the instructions to:
receive, from a first network device, a user profile request, the user profile request including a user identifier for an end device;
determine that a user profile corresponding to the user identifier includes a shared service profile;
determine, based on the determining that the user profile includes a shared service profile, whether the first network device has stored the shared service profile, wherein the shared service profile include parameters that apply to multiple subscriber profiles, and wherein determining whether the first network device has previously stored the shared service profile comprises comparing a mobility management entity (MME) identifier that corresponds to the first network device to the shared profile identifier in a data structure including multiple MME identifiers associated with the shared profile identifier;

send, to the first network device, the shared service profile and a shared profile identifier for the shared service profile, when it is determined that the first network device has not stored the shared service profile; and send, to the first network device, a response to the user profile request, the response including the user identifier and the shared profile identifier for the shared service profile, wherein the response to the user profile request is sent separately from the shared service profile.

19. The non-transitory computer-readable medium claim 18, further comprising instructions to:
receive an update to the shared service profile;
identify one or more first network devices that have stored the shared service profile prior to the update; and
send the update to the one or more first network devices.

20. The non-transitory computer-readable medium claim 18, further comprising instructions to:
receive, from the first network device, another user profile request, the other user profile request including another user identifier for a different end device,
determine that another user profile corresponding to the other user identifier includes the shared service profile, and
send, to the first network device, another response to the user profile request, the other response including the other user identifier and the shared profile identifier for the shared service profile.

* * * * *